UNITED STATES PATENT OFFICE.

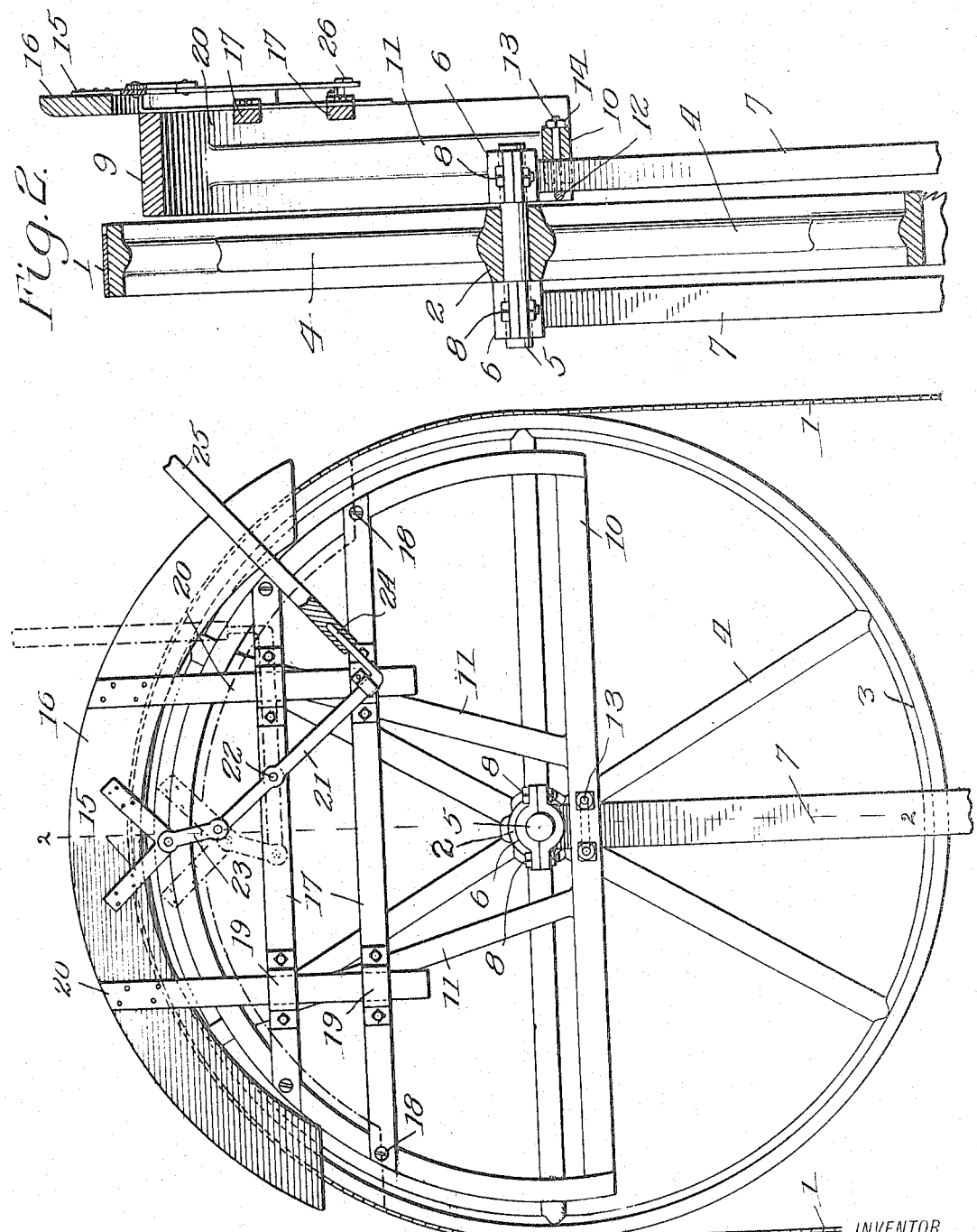

AUGUST ISAACSON, OF MARSHFIELD, OREGON.

SAW-GUARD FOR BAND-MILLS.

1,128,879.  Specification of Letters Patent.  Patented Feb. 16, 1915.

Application filed June 26, 1914. Serial No. 847,446.

*To all whom it may concern:*

Be it known that I, AUGUST ISAACSON, a citizen of the United States, and a resident of Marshfield, in the county of Coos and State of Oregon, have made certain new and useful Improvements in Saw-Guards for Band-Mills, of which the following is a specification.

My invention is an improvement in saw guards and catchers for band mills, and has for its object to provide a device of the character specified, capable of adjustment for various conditions, and wherein mechanism is provided for catching the saw should it run off the band wheel, and for preventing the running of the saw into the saw pit, to prevent damage to the saw, and to safeguard the sawyer.

In the drawings: Figure 1 is a side view of the improved guard, and Fig. 2 is a section on the line 2—2 of Fig. 1.

The present embodiment of the invention is shown in connection with a band saw 1 supported in part by a band wheel comprising a hub 2, a rim 3, and spokes 4 connecting the hub and the rim. The hub is secured to a shaft 5, which is journaled in sectional bearings 6 on supporting standards 7 in the usual manner, the bearings being sectional, and the sections being secured together by bolts and nuts 8.

The guard comprises an arc-shaped member 9 of wood or suitable material, connected at its ends to a plate 10, and spokes or supporting arms 11 are arranged between the plate 10 and the member 9. The plate 10 is of less width than the member 9, and is arranged at the center of the width of the said member, and the said plate or bar is secured to one of the supports or uprights 7, by means of a substantially U-shaped clip or clevis comprising a body 12 and arms 13.

The body is arranged transversely of one of the standards or uprights 7 on the opposite side from the plate or bar 10, and the arms 13 of the clip are passed transversely of the side edges of the upright or standard, and through openings of the plate or bar, and are engaged by nuts 14 on the opposite side from the body of the clip or clevis. The member 9 is of slightly less radius than the band wheel, and the peripheral surface thereof is arranged just inside of the peripheral surface of the band wheel, in such position that should the saw become dislodged from the periphery of the band wheel it will be caught by the periphery of the member 9 and supported thereby.

A V-shaped bracket 15 is connected to an arc-shaped plate 16 the arms of the bracket being secured to the face of the plate remote from the band-wheel, and the plate 16 is arranged at the opposite edge of the member 9 from the band wheel. The plate 16 is also mounted for movement radially with respect to the shaft 5.

Bars 17 are arranged transversely of the member 9, the said bars being parallel and spaced apart from each other and secured at their ends to the member 9, by screws 18 or the like, and the member 9 is mortised to receive the ends of the bars. Each of the bars 17 is provided with U-shaped clips or bearings 19, and the bearings of the two bars are in alinement. Guide arms 20 are secured to the face of the plate 16 adjacent to the bracket 15 and the said arms pass through the clips 19. Thus the plate 16 is guided for movement radially of the shaft 5.

A lever 21 is pivoted to the uppermost bar 17, intermediate the ends of the lever, as indicated at 22, and one end of the lever is connected to the bracket 15, by means of a link 23. The link is pivoted at one end to the lever, and at the other to the bracket at the junction of the arms. At its opposite end the lever has an angular lug 24, and an extension handle 25 is secured to the lug, for permitting the lever to be manipulated.

It will be evident that when the lever 21 is swung on its pivotal connection, as indicated in dotted lines in Fig. 1, the plate 16 will be moved radially with respect to the shaft, being guided in its movement by the arms 20 and the clips or bearings 19. A catch 26 is secured to the lowermost bar 17 at one of the bearings or clips 19, for engagement by the lever 21, to hold it in the position indicated in full lines in Figs. 1 and 2.

The plate 16 is the catcher for the saw, and when the saw is running, the plate occupies the position shown in Figs. 1 and 2, that is extended beyond the periphery of the member 9. It will be obvious that should the saw slip off the band wheel, it will be caught by the guard or shield 9, and the plate 16 prevents the saw slipping off the said shield or guard. When changing the saw, or whenever for any other reason access is desired to the saw, the plate 16 may be moved inwardly, to a position where the peripheral surface thereof will be within the peripheral surface of the member 9. When the saw is running the guard plate 16 is held in extended position, by engaging the lever with the catch 26. When the plate 16 is in lowered position, the inner edge thereof rests on the clips or bearings 19 of the lowermost bar 17. It will be noticed that the plate 9 and the catcher 16 are arranged on that side of the band wheel adjacent to the teeth of the saw.

I claim:

1. A device of the character specified, in combination with the band wheel and the standards supporting the same, of a supporting member arranged on the side of the band wheel adjacent to the teeth of the saw, said member comprising an arc-shaped plate and a bar connecting the ends of the plate, and braces arranged between the plate and the bar, said bar being secured to one of the standards, cross bars arranged transversely of the supporting member and approximately parallel with the bar and secured to the plate, and an arc-shaped guard plate arranged at the outer edge of the first-named plate, guide arms secured to the said plate and extending inward in parallel relation, guide bearings for the arms secured to the cross bars, and means for moving the said plate inwardly and outwardly, said means comprising a lever pivoted to one of the cross bars, a link connecting one end of the lever to the arc-shaped plate, and a catch for engagement by the lever to hold the plate in extended position.

2. A device of the character specified, comprising in combination with the band wheel and the standards supporting the same, of a supporting member arranged on the side of the band wheel adjacent to the teeth of the saw, said member comprising an arc-shaped plate and a bar connecting the ends of the plate, and braces arranged between the plate and the bar, said bar being secured to one of the standards, cross bars arranged transversely of the supporting member and approximately parallel with the bar and secured to the plate, and an arc-shaped guard plate arranged at the outer edge of the first-named plate, guide arms secured to the said plate and extending inward in parallel relation, guide bearings for the arms secured to the cross bars, and means for moving the said plate inwardly and outwardly.

3. A device of the character specified, comprising in combination with the band saw and the support therefor, of a guard secured to the support and having an arc-shaped peripheral surface spaced inwardly from the peripheral surface of the band wheel, an arc-shaped plate arranged at the periphery of the guard and at the edge remote from the band wheel, a slidable connection between the plate and the guard for permitting the plate to be moved inwardly and outwardly, and for guiding the plate in such movement, means for moving the plate, and means for holding the plate in extended position.

4. A device of the character specified, comprising in combination with the band saw and the support therefor, of a guard secured to the support and having an arc-shaped peripheral surface spaced inwardly from the peripheral surface of the band wheel, an arc-shaped plate arranged at the periphery of the guard and at the edge remote from the band wheel, a slidable connection between the plate and the guard for permitting the plate to be moved inwardly and outwardly, and for guiding the plate in such movement, and means for moving the plate.

5. A device of the character specified, comprising in combination with the band wheel for supporting a band saw, and the support for the wheel, of an arc-shaped guard supported with its periphery spaced inwardly from the periphery of the wheel and at the side adjacent to the teeth of the saw, an arc-shaped plate slidably connected with the guard at the edge remote from the saw, and means for moving the said plate.

6. A device of the character specified, comprising in combination with the band wheel for supporting the band saw, and the support for the wheel, of an arc-shaped guard supported with its periphery spaced inwardly from the periphery of the wheel and at the side adjacent to the teeth of the saw, a plate slidably connected with the guard at the edge remote from the saw, and means for moving the said plate radially of the wheel.

AUGUST ISAACSON.

Witnesses:
 LOUISE ROYER,
 ELVIRA FRIZEEN.